Aug. 23, 1927. 1,640,033
W. A. GEIGER
FRICTION SHOCK ABSORBING MECHANISM
Original Filed May 21, 1923 2 Sheets-Sheet 1
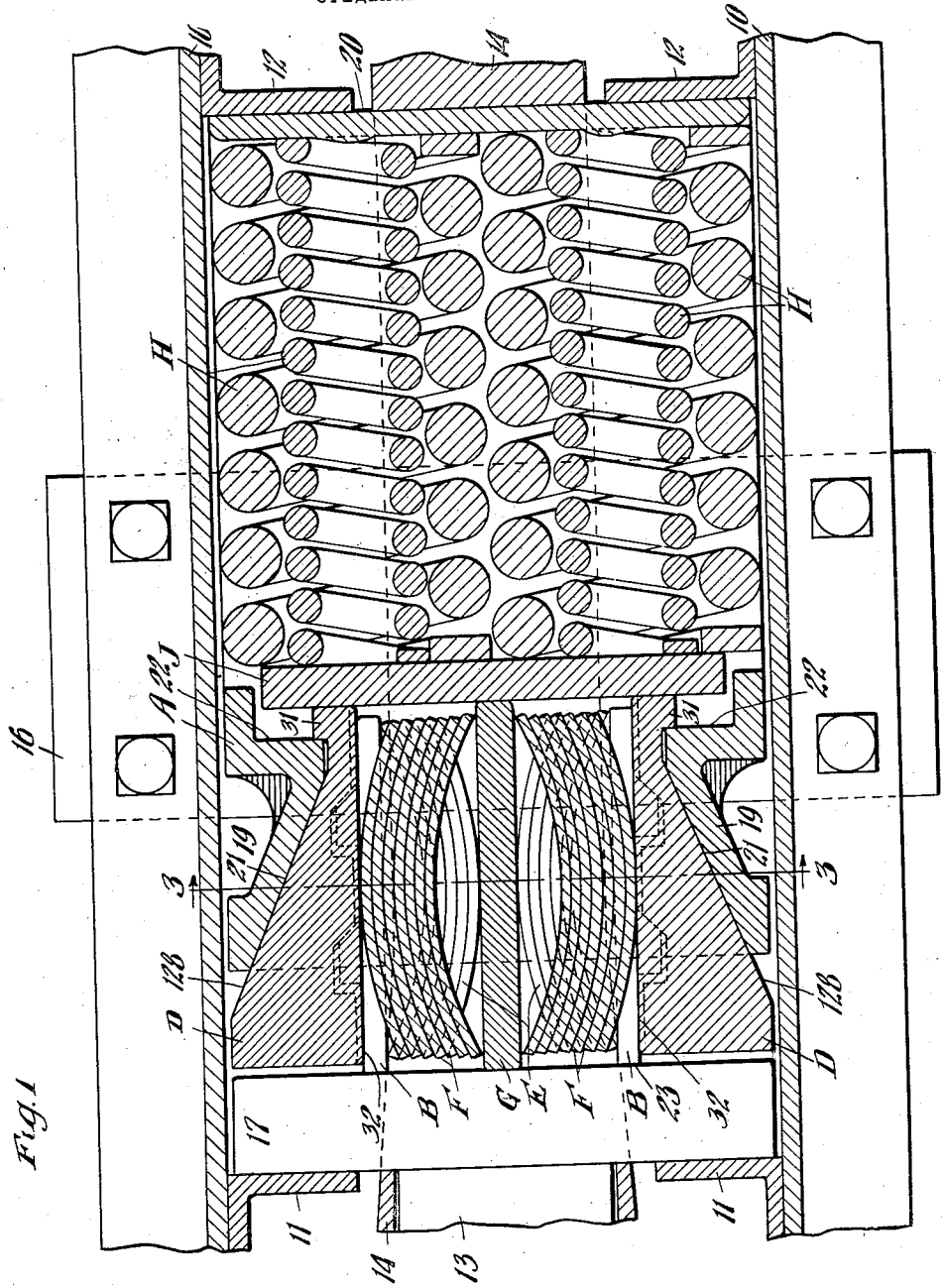

Aug. 23, 1927.
W. A. GEIGER
1,640,033
FRICTION SHOCK ABSORBING MECHANISM
Original Filed May 21, 1923  2 Sheets-Sheet 2
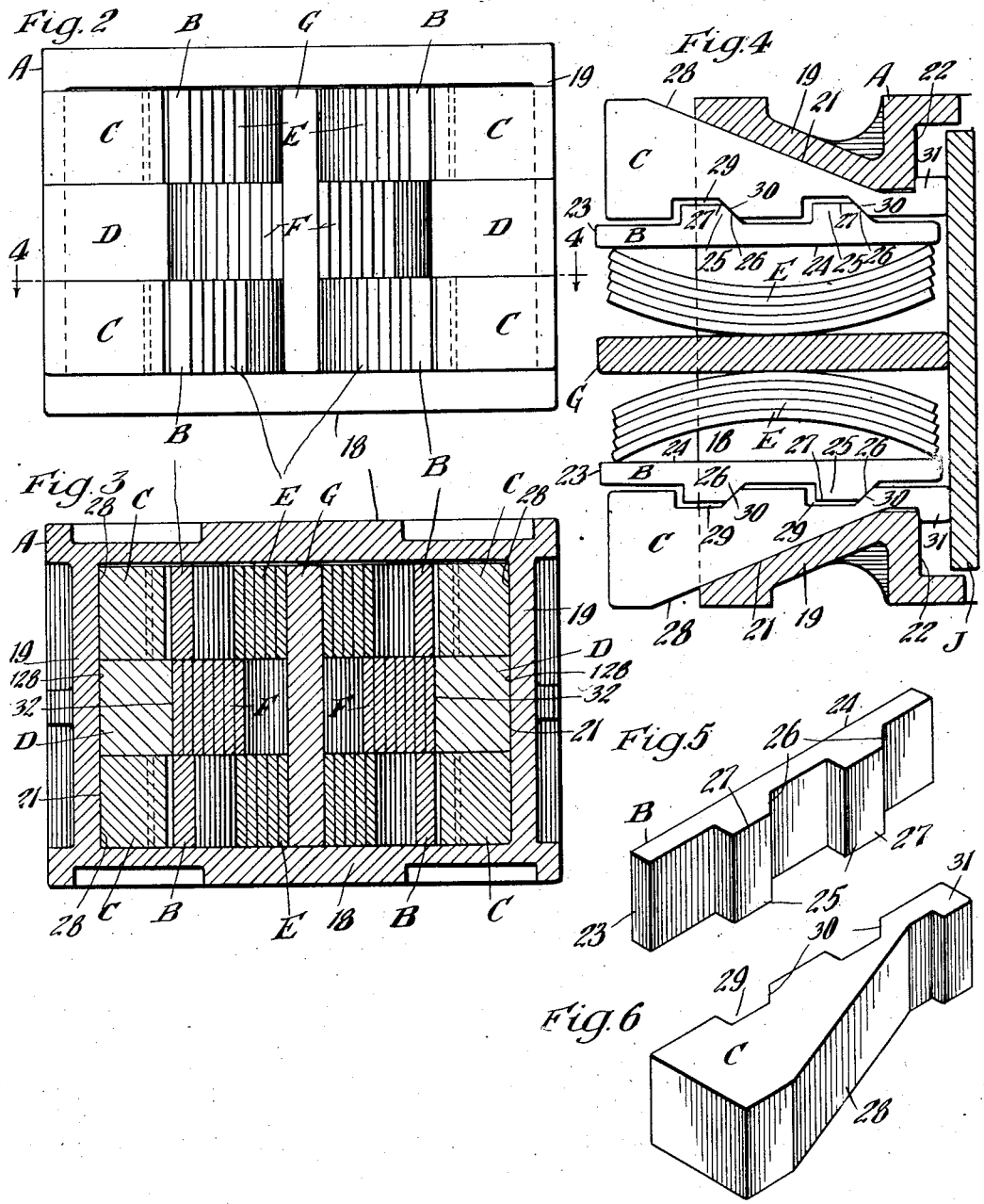
Witnesses
H. M. Rachlitz
Inventor
William A. Geiger
By George J. Haight
His Atty.

Patented Aug. 23, 1927.

1,640,033

UNITED STATES PATENT OFFICE.

WILLIAM A. GEIGER, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 21, 1923, Serial No. 640,334. Renewed February 2, 1927.

This invention relates to improvements in friction shock absorbing mechanisms.

One object of the invention is to provide a friction shock absorbing mechanism especially adapted for railway draft riggings, wherein are obtained high capacity together with certain release.

More specifically, an object of the invention is to provide a mechanism of the character indicated, wherein is employed a compressible wedge composed of a plurality of shoes so constructed as to produce a keen wedging effect, and a blunt releasing effect.

Other objects and advantages of the invention will more clearly appear from the description and claims hereinafter following.

In the drawings forming a part of this specification, Figure 1 is a horizontal, longitudinal sectional view of a portion of a railway draft rigging showing my improvements in connection therewith. Figure 2 is a front end elevational view of the friction shock absorbing mechanism proper. Figure 3 is a vertical, transverse sectional view corresponding substantially to the line 3—3 of Figure 1. Figure 4 is a horizontal, longitudinal sectional view of the friction shell portion of the mechanism, corresponding substantially to the line 4—4 of Figure 2. Figures 5 and 6 are detail perspective views of one of the wedge pressure transmitting elements and one of the co-acting wedge friction shoes, respectively.

In the said drawings, 10—10 indicates channel draft sills of the usual type, the same having front stop lugs 11 and rear stop lugs 12 secured to the inner faces thereof. The friction shock absorbing mechanism proper is operatively associated with a draw bar, the inner end of which is indicated at 13, by means of a hooded cast yoke 14, said yoke and parts therein being supported in operative position by a detachable saddle plate 16. A front follower 17, of ordinary form, is employed with the friction shock absorbing proper.

The friction shock absorbing mechanism proper, as shown, comprises, broadly, a combined friction shell and spring cage casting A; two pairs of upper and lower pressure transmitting elements B—B; two pairs of upper and lower wedge friction shoes C—C; a pair of intermediate friction wedge shoes D—D; two sets of upper and two sets of lower spring plates E—E; two sets of intermediate spring plates F—F; a central spacing plate G; a twin spring resistance H; and a spring follower J.

The combined friction shell and spring cage casting A, as shown, is of rectangular cross-section, having top and bottom walls 18—18, side walls 19—19, and integral rear wall 20, the latter functioning as the rear follower of the mechanism.

The side walls 19—19 are comparatively short so as to leave the major portion of the casting open on the sides to permit the insertion and removal of the twin springs H. The inner faces of the side walls 19 are provided with longitudinally extending friction surfaces 21—21, which are converged rearwardly at a relatively keen wedge angle with reference to the longitudinal axis of the mechanism. Rearwardly of the friction surfaces 21 the side walls 19 are cut away to provide transverse shoulders 22, for a purpose hereinafter described.

The pressure transmitting elements B are four in number, of like construction, comprising upper and lower pairs arranged at opposite sides of the mechanism. Each of the pressure transmitting elements B is in the form of a plate provided with a flat front end face 23, a flat inner side face 24, and a pair of spaced lugs 25 on the outer sides thereof, said lugs being provided with rear wedge faces 26—26 and flat side faces 27—27. The wedge faces 26 are arranged at relatively blunt angles with reference to the longitudinal axis of the mechanism. The front end faces 23 of the pressure transmitting elements are adapted to co-act with the flat rear face of the front follower and slide laterally thereon.

The wedge friction shoes C are four in number, of like construction, and are arranged in pairs above and below the shoes D, one of the shoes C being interposed between each of the pressure transmitting elements and the adjacent side wall 19 of the friction shell. Each of the wedge shoes C is provided with an outer flat face 28 similarly inclined to the wedge face 21 of the adjacent side wall of the friction shell and adapted to co-act therewith. The inner flat face of each of the shoes C is provided with a pair of spaced recesses 29 adapted to receive the lugs 25 of the corresponding wedge element B, the rear walls 30 of the recesses being inclined to correspond with the wedge faces 26 of the shoe and forming wedge faces co-acting therewith. Each of the shoes C is also provided with a laterally extending flange 31 adapted to co-act with one of the shoulders 22 of the shell, thereby limiting the outward movement of the shoes. As clearly shown in Figures 1 and 4, the outer ends of the shoes C are normally slightly spaced from the rear face of the follower 17.

The two sets of upper and the two sets of lower spring plates E are interposed between the opposite pressure transmitting elements C of the upper and lower pairs and tend to yieldingly hold the same in separated relation. Each of the sets of spring plates E comprises a plurality of nested curved plates, as clearly shown in Figure 4, bearing on the flat faces 24 of the pressure transmitting elements B and spaced apart by the centrally arranged spacing plate G engaging with the convex inner faces of the innermost plates of each set.

The intermediate wedge friction shoes D, are two in number and of similar construction. The shoes D are arranged on opposite sides of the mechanism and are interposed between the upper and lower shoes C. Each of the wedge shoes D is provided with an outer flat face 128 similarly inclined to the wedge face 21 of the adjacent side wall of the friction shell and adapted to co-act therewith, and an inner flat face 32 adapted to co-act with the spring-plates F. Each of the shoes D is also provided with a laterally extending flange corresponding to the flange 31 of the shoes C and adapted to co-act with one of the shoulders 22 of the shell, thereby limiting the outward movement of the shoes D. As clearly shown in Figure 1, the front ends of the shoes D are normally slightly spaced from the rear face of the follower 17, and the front and rear ends of the plate G are in abutment with the rear face of the follower 17 and the front face of the spring follower J, respectively.

The two sets of spring plates F—F, are arranged between the upper and lower sets of spring plates E—E and interposed between the opposite pressure transmitting elements D and the spacing plate G. The spring plates F tend to yieldingly hold the shoes D in separated relation. Each of the sets of spring plates F comprises a plurality of nested plates similar to the plates E, but oppositely arranged, as clearly shown in Figure 1, having the convex face of the outermost plate of each set bearing on the flat face 32 of the shoe D. By arranging the sets of spring plates E and F reversely the plates of each set are held in proper assembled relation.

The inner ends of the shoes C and D are directly engaged by the spring follower plate J, co-acting with the twin spring resistance H interposed between the latter and the rear wall 29 of the spring cage. Outward movement of the follower plate J is limited by engagement of the flanges 31 of the shoes C and D with the shoulders 22 of the shell. The spring resistance H is inserted under initial compression and normally holds the parts in the position shown in Figure 1 with the flanges 31 of the friction shoes C and D in abutment with its shoulders 22 of the casting A.

The operation of the mechanism, assuming an inward or buffing movement of the draw bar is as follows. As the follower 17 is moved inwardly toward the shell, the pressure transmitting elements B will be forced inwardly, thereby carrying the wedge shoes C therewith opposed by the resistance of the spring H, there being substantially no relative movement between the pressure transmitting elements B and the wedge friction shoes C due to the bluntness of the co-acting wedge faces 26 and 30, respectively, thereof. During the initial action, the shoes D remain substantially stationary, being picked up by the follower after the shoes C have been moved inwardly a distance equal to the space between the front end of the shoes D and the follower 17, whereupon the shoes C and D will be moved inwardly in unison. It will be evident that, as the shoes C move inwardly during the time that the shoes D remain substantially stationary, the spring follower J will be moved rearwardly relatively to the shoes D, thereby spacing the same slightly from the rear ends of the shoes D. During the inward movement of the wedge system including the shoes C and D, as the wedge faces 28 and 128 of the shoes travel on the wedge faces 21 of the shell there will be a simultaneous bodily movement of the shoes D and the shoes C together with the elements B relatively toward each other transversely of the mechanism, thereby compressing the yielding means comprising the spring plates E and F. It will be evident that during this operation friction will be created between the wedge faces 21 of the shell and the faces 28 and 128 of the shoes.

Upon discontinuance of the compressing force, the initial action will be a slight movement of the elements B laterally outwardly on the faces 30 of the shoes C, due to the expanding action of the spring means comprising the sets of plates E. This initial action is facilitated by the relative bluntness of the co-operating wedge faces 26 and 30 of the elements B and shoes C. As will be seen upon reference to Figures 1 and 4, a slight clearance is left between the flat outer side faces of the element B and the adjacent flat faces of the shoes C and between the outer faces of the lugs 25 and the bottom faces of the recesses 29, to permit of this movement. The wedging pressure on the faces 28 and 21 of the shoes C and the shell, respectively, is thus relieved, permitting the spring to move the shoes C outwardly, the spring follower J immediately thereafter engaging the inner ends of the shoes D, whereupon the shoes C and D will be moved outwardly as a unit and the parts all restored to normal position, as shown in Figure 1, with the flanges 31 of the shoes C and D engaging the shoulders 22 of the shell. It will be evident that after the wedging pressure between the shoes C and the shell has been relieved, the entire expanding force of the spring resistance is available to project the wedge shoes D outwardly, so that the frictional resistance between the shoes D and the shell will be readily overcome, thereby releasing the shoes. When the parts are in normal position, the opposed faces of the elements B and shoes C will be slightly spaced apart, as shown, due to the action of the twin spring resistance H, the spring resistance H being of greater capacity than the springs E.

During draft, the operation of the mechanism is the reverse of that just described, the casting A being moved toward the front follower 17, which is held stationary.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a main spring resistance; wedge means co-acting with said shell and including a plurality of wedging members, certain of which have keen angled wedge faces co-acting with said shell, and others of which have blunt wedging surfaces co-acting with blunt wedge faces on some of said keen faced members, said blunt faced wedge members being arranged to permit movement thereof outwardly relative to said first mentioned wedging members when the compressing force upon the wedge means is discontinued; and expansible means bearing upon said last mentioned wedge members and operating to yieldingly maintain the same in spaced relation.

2. In a friction shock absorbing mechanism, the combination with a friction shell; of a spring resistance; a multiple part compressible wedge co-acting with the shell, including a plurality of independent sets of co-acting wedge members, said sets being arranged to permit relative movement therebetween, whereby one of said sets moves in advance of the other of said sets upon a compression stroke of the mechanism; and means co-operating with the main spring resistance and certain sets of wedge members for relieving the pressure of the advanced set of co-acting wedge members when the compressing force upon the mechanism is released.

3. In a friction shock absorbing mechanism, the combination with a friction shell provided with interior wedge faces; of a spring resistance; and a multiple part compressible wedge co-acting with said shell wedge faces, said wedge including a plurality of keen angled wedge shoes, certain of said shoes being also provided with flat inner faces, and the remaining shoes being provided with additional wedge faces extending at a relatively blunt angle with reference to the longitudinal axis of the mechanism, a plurality of wedge members having wedge faces correspondingly inclined to the blunt wedge faces of said shoes and co-acting therewith, and yielding means interposed between the shoes having the flat inner faces, and between the wedge members, tending to hold said wedge expanded.

4. In a friction shock absorbing mechanism, the combination with a friction shell provided with interior faces extending at relatively keen angles with reference to the longitudinal axis of the mechanism; of a spring resistance; a plurality of wedge shoes, certain of said wedge shoes being provided with inner flat faces and the remaining shoes being provided with inner blunt wedge faces, and all of said shoes being provided with keen wedge faces co-acting with the shell wedge faces; a plurality of pressure transmitting elements, said elements being provided with blunt wedge faces adapted to co-act with the blunt wedge faces of said shoes; and resilient means interposed between said elements, and between said shoes having the inner flat faces.

5. In a friction shock absorbing mechanism, the combination with a friction shell provided with interior wedge faces; of a spring resistance; a plurality of sets of pressure transmitting elements provided with wedge faces; resilient means tending to hold said elements separated; a plurality of sets of wedge shoes co-acting with said shell wedge faces, certain of said shoes being interposed between said elements and the shell wedge faces; and co-acting means on said shell and shoes for limiting the outward movement of the latter relatively to the shell.

6. In a friction shock absorbing mechanism, the combination with a friction shell having interior wedge faces; of a plurality of sets of friction shoes co-acting with said shell wedge faces; resilient means tending to hold the shoes of each set separated; a pressure transmitting means co-acting with certain of said shoes for moving the same in advance of the remaining shoes; and yielding means resisting inward movement of the shoes with reference to the shell.

7. In a friction shock absorbing mechanism, the combination with a friction shell having interior wedge faces extending at a relatively keen angle with reference to the longitudinal axis of the mechanism; of pressure transmitting elements having wedge faces extending at relatively blunt angles with reference to said axis; means for yieldingly holding said elements separated; a shoe interposed between each of said elements and the shell, said shoes having wedge faces correspondingly inclined to the wedge faces of said elements and shell, respectively; additional shoes co-acting with the shell and having wedge faces correspondingly inclined to the shell wedge faces; means for yieldingly holding said last named shoes separated; a spring resistance; and a spring follower interposed between the inner ends of all of said shoes and said spring resistance.

8. In a friction shock absorbing mechanism, the combination with a friction shell having a pair of inwardly converging wedge faces on the interior thereof; of two pairs of pressure transmitting elements provided with wedge faces; resilient means interposed between the elements of each pair; a friction shoe interposed between each element and the adjacent wedge face of the shell, said shoes having wedge faces co-acting, respectively, with the wedge faces of the shell and elements; a pair of additional wedge shoes having wedge faces co-acting with the shell; resilient means interposed between said last named pair of shoes; and means for yieldingly resisting movement of said first named shoes inwardly of the shell.

9. In a friction shock absorbing mechanism, the combination with a friction shell having a pair of inwardly converging wedge faces on the interior thereof, said wedge faces extending at a relatively keen angle with reference to the longitudinal axis of the mechanism; a pair of pressure transmitting elements having wedge faces extending at a relatively blunt angle with reference to said axis, means for yieldingly holding said elements separated; wedge shoes interposed between each element and the shell wedge faces, each of said shoes having a face correspondingly inclined to the wedge face of the shell and co-acting therewith, and wedge faces correspondingly inclined to the wedge faces of one of said elements and co-acting therewith; and an additional pair of wedge shoes, each having a face correspondingly inclined to a wedge face of the shell and co-acting therewith; and means for yieldingly holding said last named shoes separated.

10. In a friction shock absorbing mechanism, the combination with a friction shell having interior keen wedge faces; of a multiple part compressible wedge co-acting with said shell wedge faces, including a plurality of sets of wedge members, certain of which have keen wedge faces co-acting with said shell wedge faces and the remainder of which have co-acting blunt wedge faces; resilient means co-acting with said wedge members tending to hold the wedge expanded; and a spring resistance opposing movement of said compressible wedge inwardly of the shell.

11. In a friction shock absorbing mechanism, in combination with a friction shell; of a spring resistance; a multiple part compressible wedge co-acting with the shell including a plurality of independent sets of co-acting wedge members, and separate resilient means co-acting with each of said sets of members tending to hold said wedge expanded, said sets being arranged to permit relative movement therebetween when compressed; and means co-acting with the resilient means of one set for effecting a change in pressure in said set independently of another upon discontinuance of the compressing force upon said multiple part wedge.

12. In a friction shock absorbing mechanism, the combination with a friction shell; of a main spring resistance; a multiple part compressible wedge co-acting with the shell including a plurality of independent sets of co-acting wedge members, a separate resilient means co-acting with each of said sets of members tending to hold said wedge expanded, said resilient means being in the form of curved plates, the curved plates associated with alternate sets of wedge members being oppositely disposed to maintain the position of said plates within said wedge.

13. In a friction shock absorbing mechanism, the combination with a main follower; of a shell having inwardly converging wedge surfaces, said main follower and shell being relatively movable toward and away from each other; a friction wedge means co-operating with said shell surfaces, said friction wedge means including a plurality of members at opposite sides of the mechanism; spring means interposed between said members opposing relative approach thereof laterally, certain of said members being movable in unison with the main follower during the entire compression stroke of the mechanism and the remaining members being normally spaced from said main follower and initially stationary with reference to the shell and adapted to be engaged after a predetermined compression of the mechanism by said main follower to be moved in unison therewith during the remainder of the compression stroke; and a main spring resistance opposing movement of said friction means inwardly of the shell.

14. In a friction shock absorbing mechanism, the combination with a shell having opposed inwardly converging interior flat surfaces; of spring resistance means compressible transversely of said mechanism; friction means co-operating with said shell surfaces, said friction means comprising two sets of friction members disposed at opposite sides of said spring means and interposed between the same and the inwardly converging surfaces of the shell, the members of each set being movable in succession inwardly of the shell; and yielding means opposing movement of said friction means inwardly of the shell.

15. In a friction shock absorbing mechanism, the combination with a friction shell having inwardly converging interior opposed flat surfaces; of a transversely compressible spring means; friction means co-operating with the shell, said friction means including a set of elements interposed between the spring means and each shell surface, the elements of each set being relatively movable and provided with flat friction surfaces inclined with respect to the axis of the mechanism; pressure transmitting means, said pressure transmitting means being movable relatively to the shell for effecting movement of all of said elements inwardly of the shell and one of the elements of each set inwardly with respect to the remaining elements of said sets to a limited extent; and spring resistance means yieldingly opposing inward movement of said friction means.

16. In a friction shock absorbing mechanism, the combination with a friction shell having interior inwardly converging wedge faces at opposite sides thereof; of a multi-part compressible wedge co-operating with said wedge faces, said wedge including a plurality of relatively movable elements arranged in sets at opposite sides of the mechanism; transversely compressible spring means interposed between said sets and opposing lateral approach of the same; pressure transmitting means for moving certain of said elements inwardly of the shell and relatively to the remaining elements to a limited extent during a predetermined initial portion of the compression of the mechanism, and thereafter engaging said remaining elements to move all of said elements inwardly of the shell in unison during the remainder of the compression stroke; and a spring resistance opposing movement of said wedge inwardly of the shell.

17. In a friction shock absorbing mechanism, the combination with a shell having interior wedge faces; of a laterally compressible multi-part wedge co-operating with the wedge faces of the shell and movable inwardly thereon, said multi-part wedge including a plurality of parts movable relatively to each other longitudinally of the mechanism; yielding means opposing compression of said wedge; means movable toward and away from the shell for effecting relative movement of the parts of said wedge during a predetermined portion of the compression stroke of the mechanism and movement in unison with the parts of said wedge during the remainder of the compression stroke; and spring resistance means opposing relative movement of said multi-part wedge and shell.

In witness that I claim the foregoing I have hereunto subscribed my name this 18th day of May 1923.

WILLIAM A. GEIGER.